US008495092B2

(12) United States Patent
Piccionelli et al.

(10) Patent No.: US 8,495,092 B2
(45) Date of Patent: Jul. 23, 2013

(54) REMOTE MEDIA PERSONALIZATION AND DISTRIBUTION METHOD

(76) Inventors: Gregory A. Piccionelli, Westlake Village, CA (US); Michael M. Gerardi, Menifee, CA (US)

( * ) Notice: Subject to any disclaimer, the term of this patent is extended or adjusted under 35 U.S.C. 154(b) by 406 days.

(21) Appl. No.: 11/796,052

(22) Filed: Apr. 26, 2007

(65) Prior Publication Data

US 2007/0233744 A1    Oct. 4, 2007

Related U.S. Application Data

(63) Continuation of application No. 10/659,477, filed on Sep. 10, 2003, now abandoned.

(60) Provisional application No. 60/410,132, filed on Sep. 12, 2002.

(51) Int. Cl.
| G06F 7/00 | (2006.01) |
| G06K 9/18 | (2006.01) |
| H04M 15/00 | (2006.01) |
| G06F 17/00 | (2006.01) |

(52) U.S. Cl.
USPC ......................... 707/783; 382/186; 379/114.2

(58) Field of Classification Search
None
See application file for complete search history.

(56) References Cited

U.S. PATENT DOCUMENTS

| 174,465 A * | 3/1876 | Bell ........................... 379/167.01 |
| 2,332,511 A * | 10/1943 | Glassman et al. ............. 33/18.2 |
| 5,251,251 A * | 10/1993 | Barber et al. ............... 379/88.23 |
| 5,327,342 A * | 7/1994 | Roy ................................ 345/467 |
| 5,328,207 A * | 7/1994 | Hannah ............................ 283/77 |
| 5,428,423 A * | 6/1995 | Clark ................................ 355/77 |
| 5,448,372 A * | 9/1995 | Axman et al. ................. 386/201 |
| 5,479,491 A * | 12/1995 | Garcia et al. ............... 379/88.15 |
| 5,530,793 A * | 6/1996 | Watkins et al. .............. 358/1.18 |
| 5,537,141 A * | 7/1996 | Harper et al. ................. 725/116 |
| 5,592,537 A * | 1/1997 | Moen ........................ 379/88.11 |
| 5,729,593 A * | 3/1998 | Baker et al. ................. 379/88.19 |
| 5,743,801 A * | 4/1998 | Welander ........................ 463/44 |
| 5,782,598 A * | 7/1998 | Salzberger ........................ 412/4 |
| 5,787,151 A * | 7/1998 | Nakatsu et al. ............. 379/88.23 |
| 5,859,652 A * | 1/1999 | Silverbrook ...................... 347/2 |
| 5,864,604 A * | 1/1999 | Moen et al. ................. 379/114.2 |
| 5,923,734 A * | 7/1999 | Taskett ....................... 379/114.18 |
| 6,041,335 A * | 3/2000 | Merritt et al. .................. 715/203 |
| 6,125,356 A * | 9/2000 | Brockman et al. .............. 705/37 |
| 6,176,614 B1 * | 1/2001 | Taylor ............................. 383/63 |
| 6,215,858 B1 * | 4/2001 | Bartholomew et al. ..... 379/88.17 |
| 6,250,549 B1 * | 6/2001 | DeFabio, Jr. .................. 235/380 |
| 6,282,819 B1 * | 9/2001 | Gu ............................. 40/124.03 |
| 6,298,154 B1 * | 10/2001 | Cok ............................. 382/186 |
| 6,375,038 B1 * | 4/2002 | Daansen et al. ................ 222/52 |
| 6,425,185 B1 * | 7/2002 | Regnault et al. ............... 33/18.2 |

(Continued)

OTHER PUBLICATIONS

Meera M. Blattner "In Our Image: Interface Design—in the 1990s", IEEE 1994.*

*Primary Examiner* — Polina Peach

(57) ABSTRACT

A method of producing a personalized data file includes the steps of providing a message comprising at least one word to a person present at a site on a network and specifying a first data file, and producing a personalized data file by digitally combining the first data file and the message. The message is prepared by the person to whom the message was provided prior to being digitally combined with the first data file.

1 Claim, 4 Drawing Sheets

U.S. PATENT DOCUMENTS

| | | | | |
|---|---|---|---|---|
| 6,480,826 B2* | 11/2002 | Pertrushin | | 704/270 |
| 6,519,596 B1* | 2/2003 | Hoyt et al. | | 1/1 |
| 6,523,034 B1* | 2/2003 | Hoyt et al. | | 1/1 |
| 6,542,936 B1* | 4/2003 | Mayle et al. | | 709/250 |
| 6,603,838 B1* | 8/2003 | Brown et al. | | 379/88.22 |
| 6,665,379 B1* | 12/2003 | Brown et al. | | 379/88.18 |
| 6,700,965 B1* | 3/2004 | Ferrer et al. | | 379/201.02 |
| 6,738,457 B1* | 5/2004 | Pickering et al. | | 379/88.16 |
| 6,751,299 B1* | 6/2004 | Brown et al. | | 379/88.18 |
| 6,788,768 B1* | 9/2004 | Saylor et al. | | 379/88.13 |
| 6,816,703 B1* | 11/2004 | Wood et al. | | 455/3.04 |
| 6,837,436 B2* | 1/2005 | Swartz et al. | | 235/472.02 |
| 6,847,940 B1* | 1/2005 | Shelton et al. | | 705/2 |
| 6,907,131 B2* | 6/2005 | Verhoeven et al. | | 382/100 |
| 6,950,502 B1* | 9/2005 | Jenkins | | 379/88.12 |
| 6,976,032 B1* | 12/2005 | Hull et al. | | 707/104.1 |
| 6,993,497 B2* | 1/2006 | Yeh et al. | | 705/14.66 |
| 7,051,086 B2* | 5/2006 | Rhoads et al. | | 709/219 |
| 7,206,757 B2* | 4/2007 | Seigel et al. | | 705/26 |
| 7,216,232 B1* | 5/2007 | Cox et al. | | 713/176 |
| 7,330,110 B1* | 2/2008 | Heintzman et al. | | 340/539.1 |
| 7,671,751 B2* | 3/2010 | Russell et al. | | 340/573.3 |
| 7,891,125 B1* | 2/2011 | Piccirillo | | 40/799 |
| 8,006,261 B1* | 8/2011 | Haberman et al. | | 725/34 |
| 2001/0005834 A1* | 6/2001 | Simpson | | 705/26 |
| 2001/0051876 A1* | 12/2001 | Seigel et al. | | 705/1 |
| 2002/0002558 A1* | 1/2002 | Krause | | 707/104.1 |
| 2002/0010584 A1* | 1/2002 | Schultz et al. | | 704/270 |
| 2002/0049702 A1* | 4/2002 | Aizikowitz et al. | | 707/1 |
| 2002/0049783 A1* | 4/2002 | Berk et al. | | 707/500.1 |
| 2002/0051262 A1* | 5/2002 | Nuttall et al. | | 358/537 |
| 2002/0052785 A1* | 5/2002 | Tenenbaum | | 705/14 |
| 2002/0054331 A1* | 5/2002 | Takenobu et al. | | 358/1.15 |
| 2002/0075524 A1* | 6/2002 | Blair et al. | | 358/442 |
| 2002/0116716 A1* | 8/2002 | Sideman | | 725/91 |
| 2003/0004997 A1* | 1/2003 | Parker et al. | | 707/513 |
| 2003/0028377 A1* | 2/2003 | Noyes | | 704/258 |
| 2003/0046543 A1* | 3/2003 | Houston et al. | | 713/176 |
| 2003/0051255 A1* | 3/2003 | Bulman et al. | | 725/135 |
| 2003/0219709 A1* | 11/2003 | Olenick et al. | | 434/350 |
| 2003/0220885 A1* | 11/2003 | Lucarelli et al. | | 705/64 |
| 2004/0234097 A1* | 11/2004 | Verhoeven et al. | | 382/100 |

* cited by examiner

REMOTE MEDIA PERSONALIZATION AND DISTRIBUTION METHOD

This application is a continuation of U.S. patent application Ser. No. 10/659,477, filed Sep. 10, 2003 now abandoned, which in turn was based on U.S. Provisional Patent Application Ser. No. 60/410,132, filed Sep. 12, 2002, the entire disclosures of each of which are incorporated herein by reference.

FIELD OF THE INVENTION

The present invention relates to a method, system and apparatus for producing, vending and distributing personalized items, such as photographs, videos and the like.

BACKGROUND OF THE INVENTION

Celebrities, such as actors, athletes, political leaders, etc., often make personal appearances at which they provide autographs and personalized items, such as photographs, to members of the public. Due to geographic constraints, crowd size limitations and the like, it is often difficult or impossible for members of the public to meet the celebrities in order personally to obtain the autograph or personalized item from the celebrities.

A need exists for a method and system for providing personalized items, in particular autographed photographic images, to members of the public who cannot personally attend events at which their favorite celebrities appear.

SUMMARY OF THE PREFERRED EMBODIMENTS

In accordance with one aspect of the present invention, there is provided a method of producing a personalized data file. The method includes the steps of providing a message comprising at least one word to a person present at a site on a network and specifying a first data file, and producing a personalized data file by digitally combining the first data file and the message. The message is prepared by the person to whom the message was provided prior to being digitally combined with the first data file.

According to particular embodiments, the first data file comprises at least one image, such as a photographic image, a graphic file, a text file, and the like. In more particular embodiments, the first data file comprises a photographic image, and the message is written by the person using a device which producers a data file corresponding to the message. The data file so produced is digitally overlaid on the photographic image.

In other more particular embodiments, the first data file is a video file comprising a plurality of frames. The message is written by the person using a device which produces a data file corresponding to the message, and the data file so produced is digitally overlaid on at least one of the plurality of frames.

According to still other embodiments, the message is a script including dialog to be read by the person and the first data file is a video file. In such embodiments, the dialog is read by the person and recorded to produce an audio file, and the audio file is digitally combined with the video file.

In accordance with another aspect of the present invention, there is provided a method of producing a recorded performance. The method includes the steps of providing a script to at least one person present at a site on a network, the script comprising dialog and directions for action, and recording a performance of the script by the at least one person.

Further particular embodiments of the foregoing methods provide for a user requesting the personalized data file to be charged a premium.

In accordance with a further aspect of the present invention, there is provided a system for producing a personalized data file. The system includes means for accessing a site on a network, means for providing a message to a person present at the site on the network, means for selecting a data file, means for enabling a person present at the site on the network to prepare the message, and means for combining the message so prepared with the data file to produce a personalized data file Other features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which.

DETAILED DESCRIPTION OF THE PREFERRED EMBODIMENTS

Figure 1:
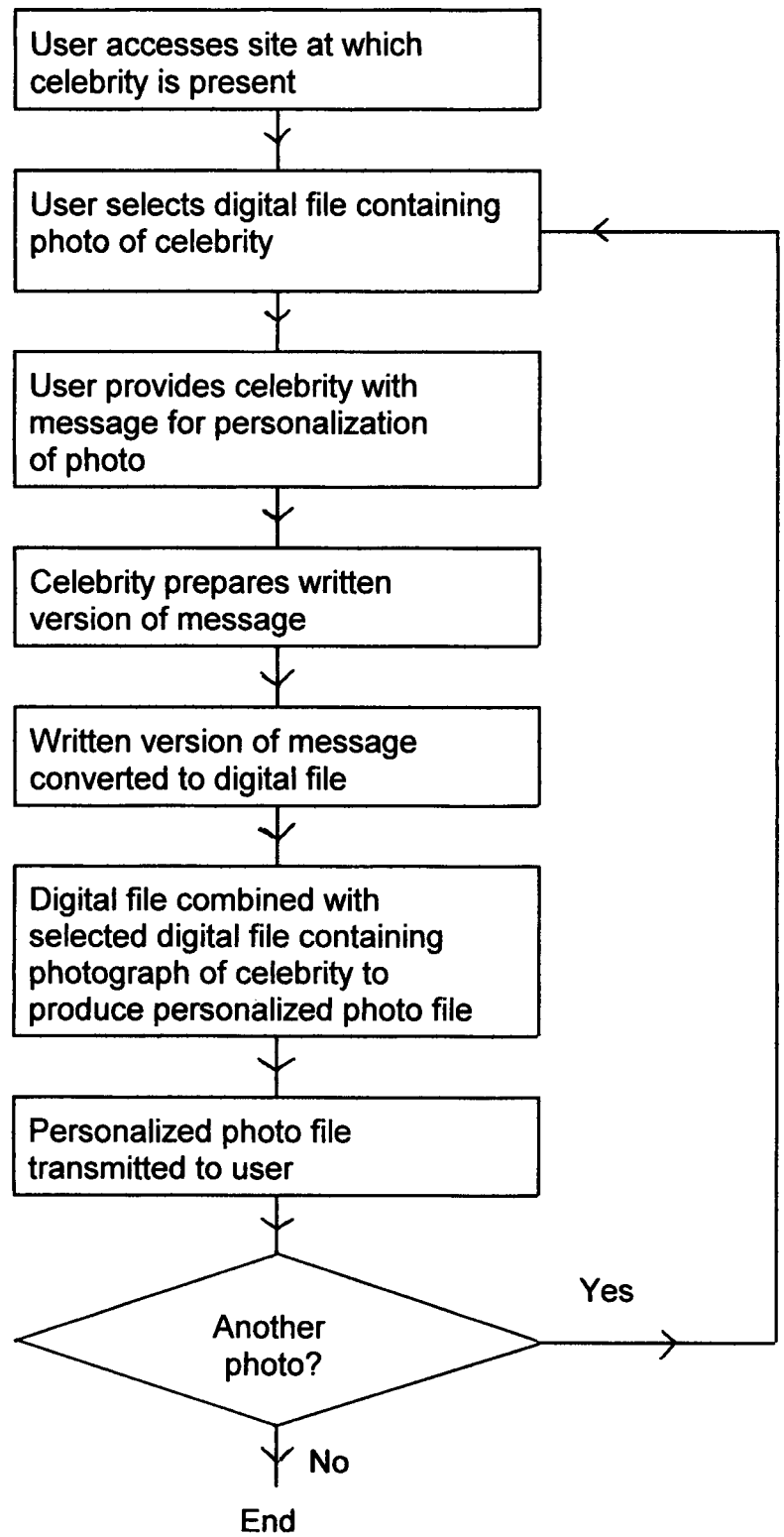
FIG. 1 is a flowchart illustrating a method by which a user is enabled to obtain a data file containing a photographic image of a celebrity with a personalized-message autographed by the celebrity.

Turning now to the embodiment illustrated in FIG. 1, a user first accesses a site at which a celebrity, such as-a movie performer, athlete, political leader, etc. Is present. Such a site can be a World Wide Web site, an Internet site or a site on another wide-area or local network, and can be associated with a business, a home, an office or any other desired physical location. In one more specific embodiment, the user accesses the site from a remote location, such as the user's home or office. In another more specific embodiment, the user accesses the site from a computer terminal on the premises at which the celebrity is present, such as at a bookstore, auditorium, etc.

Figure 2:
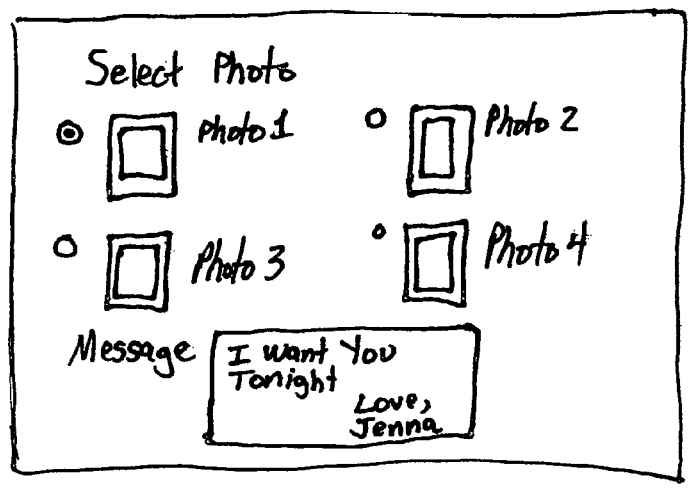
FIG. 2 is an illustration of a menu useful in carrying out a method of FIG. 1.

Once the user accesses the site, he next accesses a menu provided by the site that presents one or more photographic images of the celebrity for which the user can request personalization by the celebrity. An example of such a menu is shown in FIG. 2. In particular embodiments, the user points and clicks on a photographic image of interest. In other embodiments, the user selects a number associated with the photographic image of interest and inputs that number in an appropriate location, such as another menu or another location on the photographic image menu.

Next, the user provides the celebrity with a message with which the user desires the celebrity to personalize the selected photographic image. In particular embodiments, the user types the desired message at an appropriate location on a menu. In other embodiments, the user can provide an audio file containing a verbal request for the desired message. The message can include one or more words numerals, symbols or other images, and can be in any desired language and/or alphabet. In other specific embodiments, the user can select a message from a menu of standard messages.

Once the desired message has been prepared, it is then transmitted to the site at which the celebrity is present. In particular preferred embodiments, at this point an arrangement is made by which the user provides a payment to the celebrity for the personalized photographic image. Any desired means for arranging such payment can be employed, for example, use of a credit card by the user. Alternate means of value exchange, such as registration of the personalized photographic image with a membership account owned by the user and associated with the celebrity, can also be employed.

In any event, at this point the celebrity prepares a written version of the desired message, which is then converted to digital form. In particular embodiments, the celebrity writes the message on an electronic pad, which then produces a digital data file corresponding to the written message. In other embodiments, the celebrity can prepare a written message on a sheet of paper which is subsequently-scanned to produce a digital data file corresponding to the written message. Any other desired method of producing such a digital data file can also be employed.

Once the digital data file corresponding to the written message has been produced, it is next combined with the data file containing the selected photographic image to produce a combined file. Any conventional technique for producing combined digital data files can be employed. The resulting combined digital data file yields a photographic image upon which the written message is overlaid, to achieve a personalized photographic image of the celebrity.

Once the combined data file including the personalized photographic image has been prepared, it is then transmitted to the user for subsequent viewing, for example after downloading to a color printer, on a computer monitor, etc. The user, in particular embodiments, is then given the option of requesting another personalized photographic image.

The foregoing method has been described in connection with a photographic image. However, any other type of text or graphic file that generate an autographed hard copy can also be used and is considered to be within the scope of this invention. Additional non-limiting examples include e-books and excerpts thereof, sheet music, graphic files containing reproductions of the celebrity's artwork(s), etc.

Turning to FIG. 2, a second embodiment which enables a user to obtain a personalized video includes the initial step, as with FIG. 1, in which a user accesses a site at which a celebrity or other performer is present The user next accesses a menu in which are listed one or more videos in which the celebrity/performer appears, and selects a video of interest. After selecting the desired video, the user next provides the celebrity/performer with a script to accompany the video. Such a script can include, in particular embodiments, dialog to be read by the celebrity/performer directed to the user or to another person. For example, the script can direct the celebrity/performer to address the user by name, express a desire that the user were present with the celebrity/performer, etc.

After receipt of the script from the user, the celebrity/performer reads the script to produce an audio file containing a recording of the script, using any conventional means for producing a digital data file containing audio information. The audio file so produced is next combined with the selected video in order to produce a personalized video with an audio track including the recording prepared by the celebrity/performer. The personalized video file is then transmitted to the user for viewing and/or downloading by the user.

As with the embodiment of FIG. 1, at some point, preferably prior to the celebrity/performer's recording of the script, an arrangement is made for payment by the user. Also as with the embodiment of FIG. 1, the user preferably is given an option to obtain another personalized video.

Figure 3:
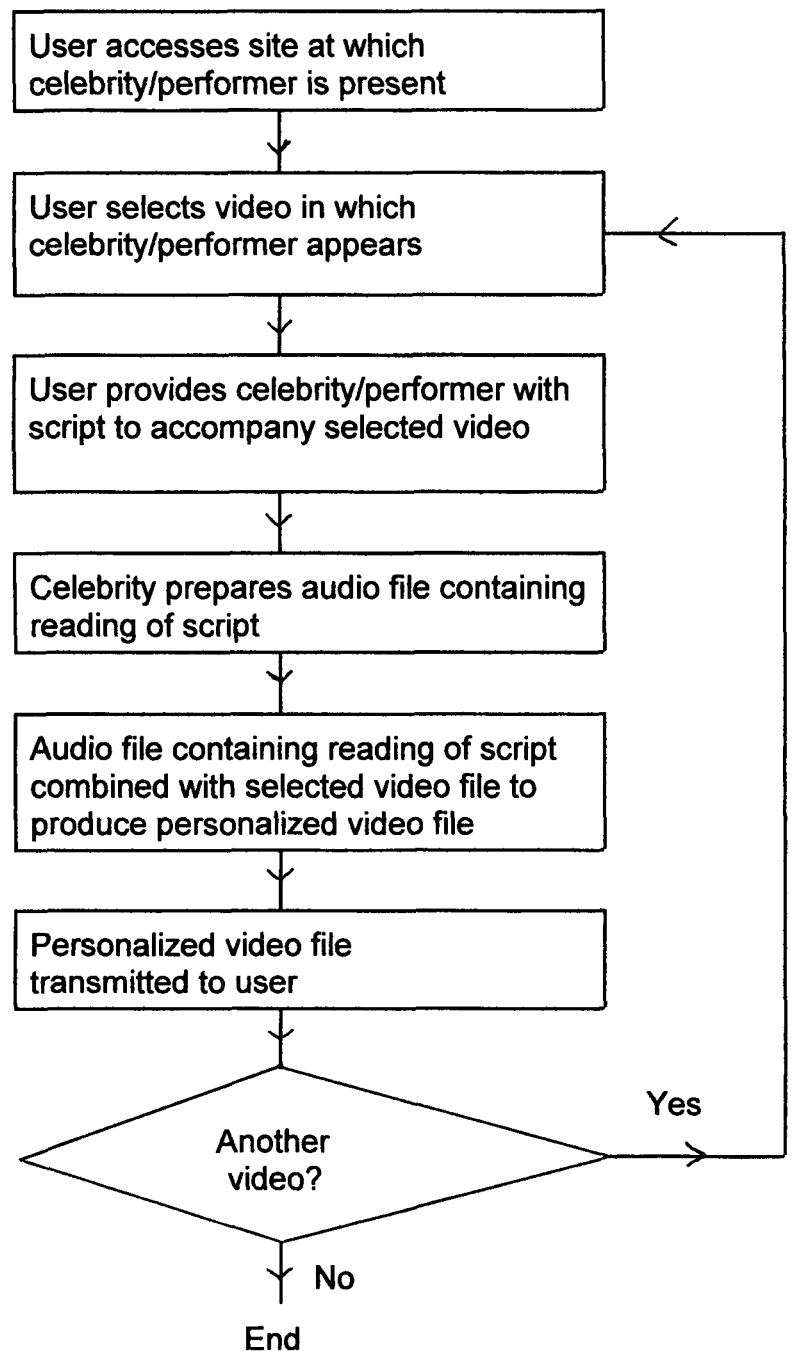
FIG. 3 is a flowchart illustrating a method by which a user is enabled to obtain a data file containing a video of a performance by a celebrity/performer with a personalized dialog performed by the celebrity/performer.
Figure 4:
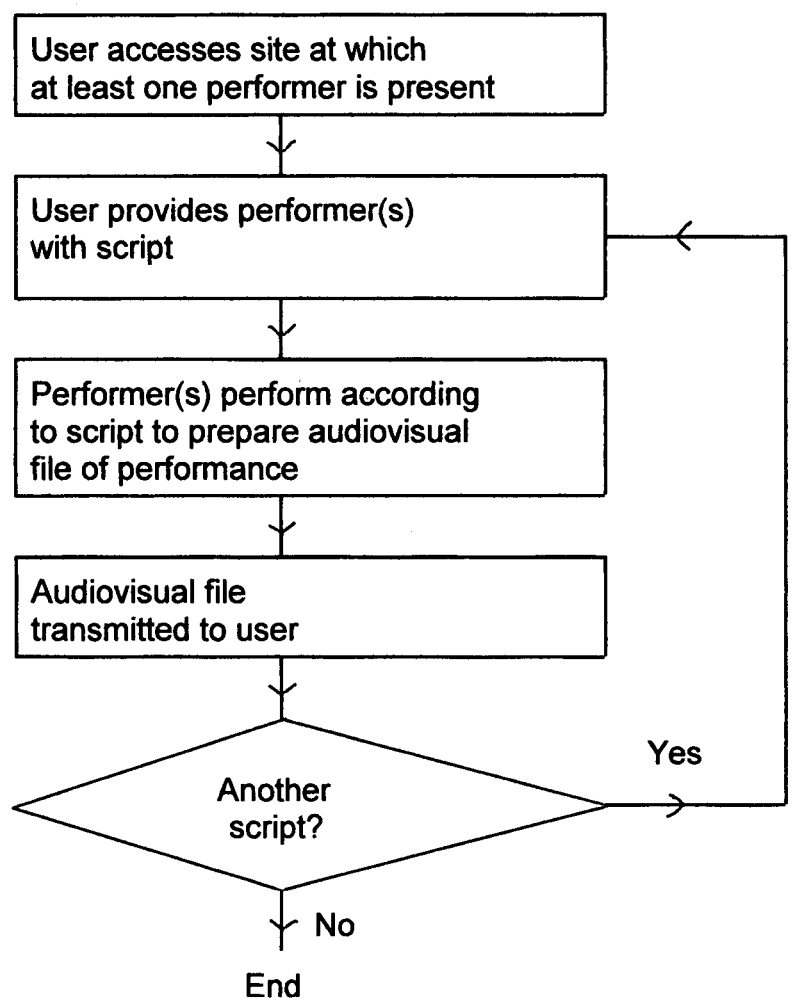
FIG. 4 is a flowchart illustrating a method by which a user is enabled to obtain a data file containing a performance in which one or more performers performs according to a script provided by the user to the performer(s)

According to another alternative embodiment as shown in FIG. 3, the user accesses a site at which one or more performers (e.g., celebrities, athletes, actresses, etc.) are present. As with the embodiment of FIG. 2; the user provides the performer(s) with a script. In this embodiment, however, the script can include directions for action as well as dialog. Upon receipt of the script (and preferably arrangement for payment as with the preceding embodiments), the script is performed by the performer(s), and the performance is recorded as an audiovisual digital data file. The file containing the recorded performance is then transmitted to the user, and in particular embodiments the user is afforded the option of providing another script for performance.

The foregoing performance may, in more particular embodiments, be subject to a record-keeping requirement, for example as set forth in 18 U.S.C. .sctn. 2257. To comply with such record-keeping requirements, information required by the record-keeping requirements is included in the recorded performance. Procedures for doing so are described in U.S. patent application Ser. No. 10/644,635, entitled "Record-Keeping System for Performances Over a Network," to Piccionelli et al, filed Aug. 19, 2003, which is incorporated herein in its entirety by reference.

Figure 5:
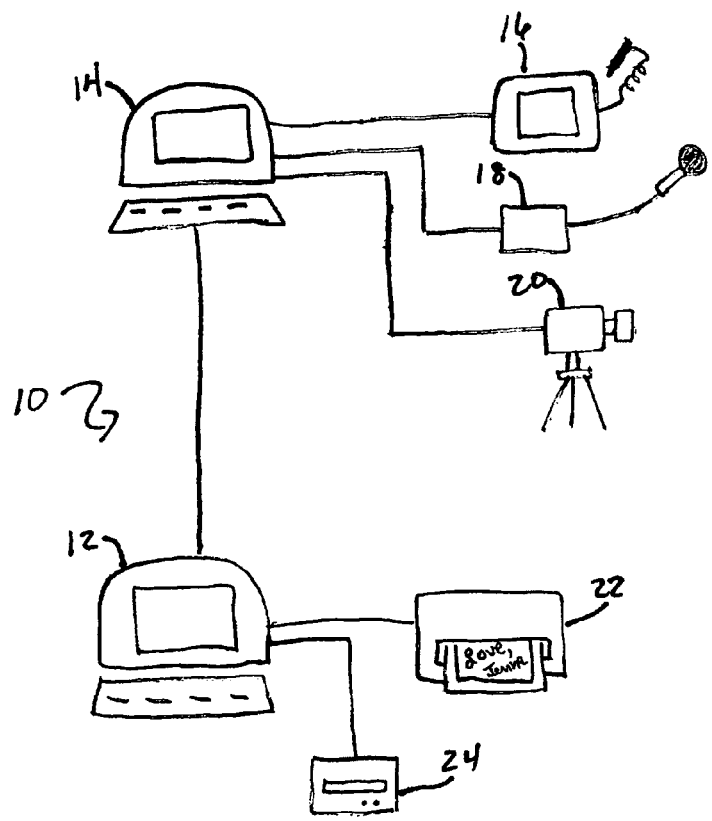
FIG. 5 is a schematic representation of a system useful for carrying out methods according to the invention.

Systems and apparatus for implementing the foregoing inventive methods can include, for example, servers, electronic pads, recording devices for producing digital audio files, video recording devices, and the like. FIG. 5 illustrates an exemplary system. A user logs onto a network using a personal computer 12 and accesses a site on the network at which the celebrity is present. The user then accesses a menu, for example as illustrated in FIG. 2, selects a photograph for personalization, and provides a message for the celebrity to prepare. The celebrity then prepares the message using a device such as an electronic pad 16, producing a digital data file corresponding to the message. The digitized message is then combined with a data file corresponding to the selected photograph to produce a personalized image, here an autographed photograph. The personalized image is then provided to the user via the network, and the user then downloads the personalized image using printer 22.

If desired, the user can also request personalized video files containing an audio message as described above, in which case the celebrity records a message using recording device 18. Furthermore, the user can provide a script to the celebrity for production of a recorded performance, in which case the celebrity performs according to the script is and is recorded using camera 20 and/or recording device 18. The recorded performance is then provided to the user via the network, and the user downloads the performance for viewing on computer 12, and if desired records the downloaded performance, for example by using CD burner 24.

What is claimed is:

1. A method of providing a personalized data file over a network to a user of a computer, the data file being personalized by a person selected by the user, the selected person being distinct from the user, the method comprising the steps of:
   a) accessing by a computer a site on a network over which a message is providable to a person, the person being selected by a user to personalize a data file, the selected person producing a personally identifiable handwriting,
   b) accessing by the computer a menu on the site on the network, the menu presenting at least one digital data file comprising data associated with the selected person, the at least one digital data file being selected from the group consisting of a photographic image of the selected person and a video file comprising a plurality of frames,
   c) selecting a first digital data file from the at least one digital data file presented on the menu,
   d) providing to the selected person over the network a message comprising at least one word to be provided from the selected person to the user,
   e) producing a second digital data file corresponding to a written form of the message in the personally identifiable handwriting of the selected person, the message being written by the selected person using a device which produces a digital data file substantially corresponding to the message, the digital data file being produced by the selected person at the site on the network to whom the message was provided in step d),
   f) producing a personalized data file by using a computer to combine the first and second digital data files, wherein
      (i) when the first digital data file selected in step (c) is a photographic image the second digital data file produced in step (e) is digitally overlaid on the photographic image, and
      (ii) when the first digital data file selected in step (c) is a video file comprising a plurality of frames the second digital data file produced in step (e) is digitally overlaid on at least one of the plurality of frames, and
   g) providing the personalized data file to the user over the network.

* * * * *